United States Patent
Melander et al.

(10) Patent No.: US 9,462,079 B2
(45) Date of Patent: Oct. 4, 2016

(54) SYSTEM AND METHOD FOR PROCESSING COMPUTATIONAL ELEMENTS ALLOCATION

(75) Inventors: Bob Melander, Sigtuna (SE); Jan-Erik Mängs, Solna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 354 days.

(21) Appl. No.: 13/322,632

(22) PCT Filed: Jun. 1, 2009

(86) PCT No.: PCT/IB2009/005792
§ 371 (c)(1),
(2), (4) Date: Feb. 2, 2012

(87) PCT Pub. No.: WO2010/140013
PCT Pub. Date: Dec. 9, 2010

(65) Prior Publication Data
US 2012/0131198 A1    May 24, 2012

(51) Int. Cl.
*G06F 15/173*    (2006.01)
*H04L 29/08*    (2006.01)
*G06F 9/50*    (2006.01)

(52) U.S. Cl.
CPC ............ *H04L 67/34* (2013.01); *G06F 9/5027* (2013.01); *G06F 9/5033* (2013.01)

(58) Field of Classification Search
CPC .............................. H04L 67/34; G06F 9/5027
USPC .................................................. 709/222–226
See application file for complete search history.

(56) References Cited

U.S. PATENT DOCUMENTS

| | | |
|---|---|---|
| 2003/0120780 A1 | 6/2003 | Zhu et al. |
| 2003/0212787 A1* | 11/2003 | Qiu et al. .................. 709/224 |
| 2004/0073673 A1 | 4/2004 | Santos et al. |
| 2005/0138435 A1* | 6/2005 | Kaufman et al. ......... 713/202 |
| 2006/0126104 A1* | 6/2006 | Kumar ..................... 358/1.15 |
| 2007/0226229 A1* | 9/2007 | Psounis et al. ............ 707/10 |
| 2008/0082649 A1* | 4/2008 | Gazier et al. ............. 709/223 |
| 2008/0082933 A1* | 4/2008 | Howard et al. ........... 715/771 |
| 2008/0295094 A1 | 11/2008 | Korupolu et al. |
| 2009/0248865 A1* | 10/2009 | Kodama ............... G06F 9/505 709/224 |
| 2009/0254917 A1* | 10/2009 | Ohtani .................... 718/104 |
| 2009/0276781 A1* | 11/2009 | Chan .................. G06F 9/4881 718/103 |
| 2010/0250612 A1* | 9/2010 | Reuveni et al. .......... 707/799 |

(Continued)

OTHER PUBLICATIONS

International Search Report in corresponding International Application No. PCT/IB2009/005792 mailed Jan. 8, 2010.

(Continued)

*Primary Examiner* — Chris Parry
*Assistant Examiner* — Weiwei Stiltner
(74) *Attorney, Agent, or Firm* — Patent Portfolio Builders PLLC (57) ABSTRACT

A unit (16), computer readable medium and method for automatically providing processing elements allocation in a network (14) for a droplet of a user (10) based on a request (30) of the user (10). The method includes receiving at the unit (10) of the network (14) the request (30) that includes at least a required condition or a preference related to the droplet; processing at the unit (16) the request (30), based on various known characteristics of the network (14); and automatically mapping processing elements (82) of the network (14) to the droplet such that an output of the processing step includes the processing elements allocation for the droplet and complies with the request.

12 Claims, 6 Drawing Sheets

(56) References Cited

U.S. PATENT DOCUMENTS

2010/0268789 A1* 10/2010 Yoo et al. ............... 709/214
2010/0306354 A1* 12/2010 DeHaan et al. ........... 709/222

OTHER PUBLICATIONS

International Report on Patentability in corresponding International Application No. PCT/IB2009/005792 mailed May 26, 2011.

* cited by examiner

60 ⌒ DROPLET {
    62 ⌒ IDENTIFIER id;
    64 ⌒ MANIFESTATION manif;
    66 ⌒ CREDENTIALS creds;
}

FIG. 5

Droplets are X,Y,Z
X is downstream of Y
Path bandwidth Y −> X > 10 Mbps

Y is downstream of Z
Path bandwidth Z −> Y > 50 Mbps

Minimize Propagation Delay (Y, X)

CPU_intensive(X)
disk_intensive(Y), capacity > 200 GB
Location(Z) = Stockholm

Droplet X -> Processing Node PN4
Droplet Y -> Processing Node PN1
Droplet Z -> Processing Node PN7

*Droplet X -> Processing Node PN4 as Processing Element PE1*
*Droplet Y -> Processing Node PN1 as Processing Element PE2*
*Droplet Z -> Processing Node PN7 as Processing Element PE3*

SYSTEM AND METHOD FOR PROCESSING COMPUTATIONAL ELEMENTS ALLOCATION

TECHNICAL FIELD

The present invention generally relates to systems, software and methods and, more particularly, to mechanisms and techniques for efficient processing elements allocation in a network.

BACKGROUND

During the past years, the evolution of distributed computing that is offered as a service to various clients was driven by the concept of leasing hardware and software as metered services. One such model is cloud computing. Cloud computing is a style of computing in which dynamically scalable and often virtualized resources are provided as a service over the Internet to interested clients. The clients need not have knowledge of, expertise in, or control over the technology infrastructure "in the cloud" that supports them.

Figure 1:
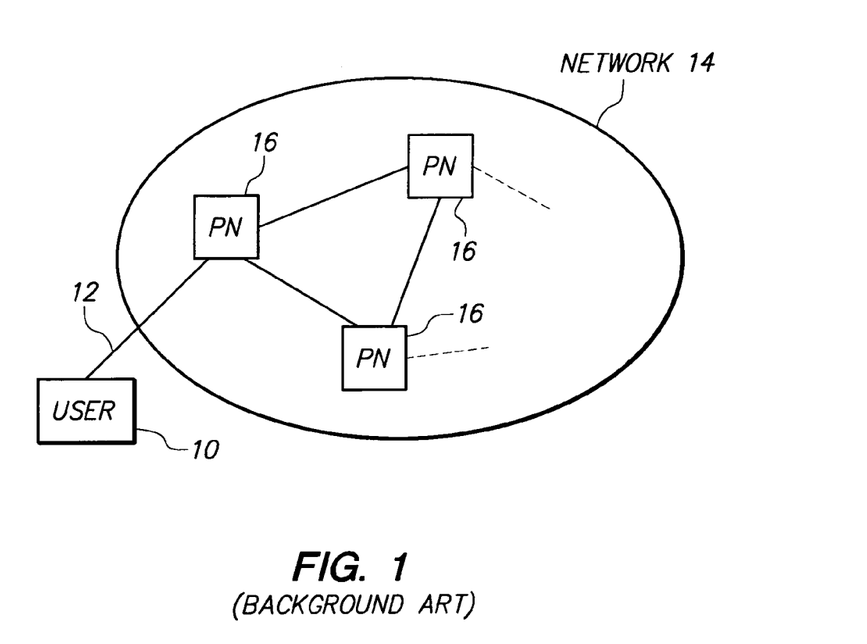
FIG. 1 is a schematic diagram of a network including processing nodes.

The concept incorporates one or more of the infrastructure as a service, platform as a service and software as a service as well as other recent technology trends that have the common theme of reliance on the Internet for satisfying the computing needs of the users. Cloud computing services usually provide common business applications online that are accessed from a web browser, while the software and data are stored on the servers. Such a scenario is illustrated in FIG. 1, in which a user 10 connects via, for example, Internet 12, to a network 14. The network 14 may include one or more processing node (PN) 16. The processing nodes PN 16 may belong to one or more providers.

Common to the operational cloud platforms are the implementation of data centers (often of massive size) hosting clusters of servers. These servers may be logically sliced using virtualization engines like XEN, or Microsoft's HyperV or VMware's ESX server. Cloud platforms are traditionally distributed across multiple data centers so as to achieve robustness and global presence. However, this distributed presence is coarse-grained, i.e., data center-based clouds consider the entire network operator simply as the first mile connectivity. The closeness of the data centers to end-users is thus limited.

However, some end-users may benefit from having processing elements/nodes of the network closer to them than the data centers-based clouds can provide. Providing servers closer to end-users imply more distributed and geographically scattered server constellations. For example, when the processing elements/nodes are highly distributed and geographically scattered across an operator's network to be situated closest to the end-users, one or more of the following problems may appear.

As the end-users may be concerned with selecting processing elements/nodes that are geographically located in a desired area, the end-users, e.g. system and software developers, will be faced with some of the following problems. The end-users may have to know which processing elements/nodes are available, where are they located, how can these processing elements/nodes be accessible, which specific processing element/node should be used for a certain component of an application.

To select appropriate processing elements in response to all these questions, especially when the number of resources/servers in a large network may be in the range of hundreds or thousands, is challenging, i.e., time consuming and/or prone to mistakes. Supplementary resources have to be employed only to correctly distribute the existing tasks/applications to the large network. The complexity of the selection becomes itself a problem, which may overwhelm the end-user, especially if the platform is a simple constellation of independent servers, i.e., servers that are "glued" together by nothing more than plain IP connectivity.

Further complications arise as the network operator, i.e., the operator of network 14 in FIG. 1, maintains confidentiality of the design and topology of the network, e.g., the locations of the processing elements/nodes, the available resources, the particular division of the real nodes into virtual nodes, etc. In this case, even if the end-user 10 has the capability to determine which machine (real or virtual) to process which component of an application, by not knowing the topology and availability of the network 14, the end-user 10 cannot make use of the advantages provided by the network 14.

For illustrating the limitations of the traditional methods and networks, the following two examples are considered. Two real life tasks are deployed in an operational network-based processing platform. The first task is to dispatch an application on every processing element close to an edge of the network 14, which is closer to the end-user 10. The second task is to execute a distributed application, which includes two software modules (x and y), on separate processing elements while fulfilling the condition that x is always upstream of y (with respect to the end user 10).

Figure 2:
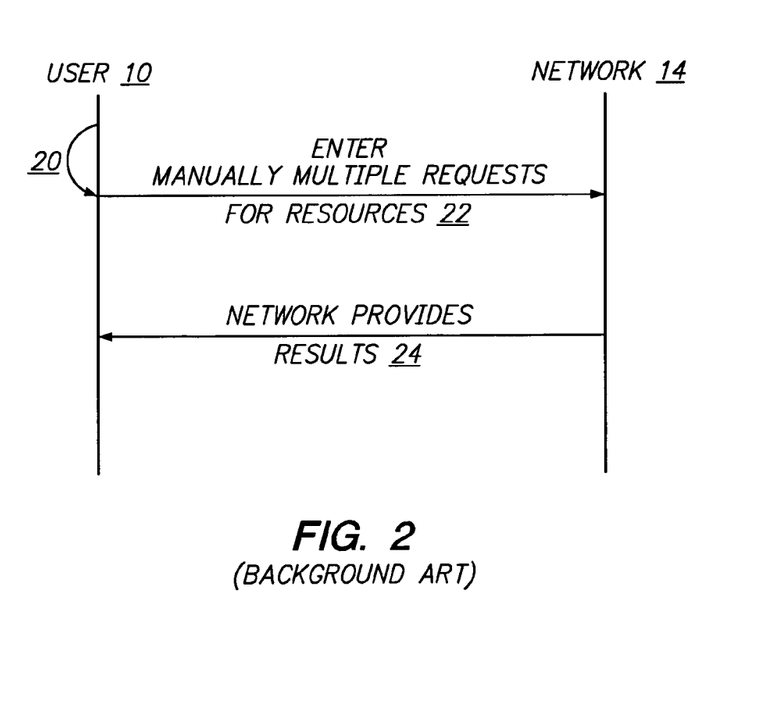
FIG. 2 is a schematic diagram illustrating signaling between a user and the network of FIG. 1.

Having to manually process such tasks as well as to implement the distribution and communication aspects of the software components and their interworking is challenging and time consuming for the system and/or software developer, especially when the number of processing elements/nodes is large. In one example, FIG. 2 generically illustrates the minimum effort that goes into such manual process. Initially, in step 20, the user 10 determines, on his/her side, which processing elements from the network are necessary, where are they located, etc. Then, in step 22, after figuring out the processing elements allocation, user 10 contacts network 14 and requests the necessary resources. The network 14 replies in step 24 to user 10, after running the applications desired by the user, with the results of the run applications on the processing elements.

More specifically, with regard to the first task discussed above, the user determines in step 20 of FIG. 2 the number of processing elements to run the desired task and also, based on his geographic location and limited geographic location provided by the network, only those processing elements that are closer to the user. With regard to the second task, the user determines in step 20 of FIG. 2 which processing elements would execute software module x and which processing elements would execute software module y. Then, the user has to determine in the same step 20 which processing elements satisfy the condition that x is always upstream of y with respect to the user 10.

From these simplified examples that require resources for only one application, it can be seen that the amount of calculation that takes place at the user side is high and time consuming.

Accordingly, it would be desirable to provide devices, systems and methods that avoid the afore-described problems and drawbacks.

SUMMARY

Remote computing systems free the users from having and maintaining sophisticated computing systems. However, such remote computing systems, due to their structure, require intense user evaluation of what processing elements of the computing systems to be used.

According to one exemplary embodiment, there is a method for automatically providing processing elements allocation in a network for a droplet of a user based on a request of the user. The method includes receiving at a unit of the network the request that includes at least a required condition or a preference related to the droplet; processing at the unit the request, based on various known characteristics of the network; and automatically mapping processing elements of the network to the droplet such that an output of the processing step includes the processing elements allocation for the droplet and complies with the request.

According to another exemplary embodiment, there is a unit in a network for automatically providing processing elements allocation in the network for a droplet of a user based on a request of the user. The unit includes a processor configured to receive the request that includes at least a required condition or a preference related to the droplet, process the request, based on various known characteristics of the network, and automatically map processing elements of the network to the droplet such that an output of the processing step includes the processing elements allocation for the droplet and complies with the request.

According to still another exemplary embodiment, there is a computer readable medium including computer executable instructions, wherein the instructions, when executed, implement a method for automatically providing processing elements allocation in a network for a droplet of a user based on a request of the user. The medium includes instructions for providing a system comprising distinct software modules, wherein the distinct software modules comprise a run-time fabric module and a mapping logic unit module; receiving at the run-time fabric module the request that includes at least a required condition or a preference related to the droplet; processing at the mapping logic unit module the request, based on various known characteristics of the network; and automatically mapping processing elements of the network to the droplet such that an output of the processing step includes the processing elements allocation for the droplet and complies with the request.

It is an object to overcome some of the deficiencies discussed in the previous section and to provide a functionality capable of determining the processing elements allocation. One or more of the independent claims advantageously provides such a functionality in a processing node of the network.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of a system including a distributed network having plural processing nodes. However, the embodiments to be discussed next are not limited to this system but may be applied to other existing systems.

Reference throughout the specification to "one embodiment" or "an embodiment" means that a particular feature, structure, or characteristic described in connection with an embodiment is included in at least one embodiment of the present invention. Thus, the appearance of the phrases "in one embodiment" or "in an embodiment" in various places throughout the specification is not necessarily all referring to the same embodiment. Further, the particular features, structures or characteristics may be combined in any suitable manner in one or more embodiments.

Figure 3:
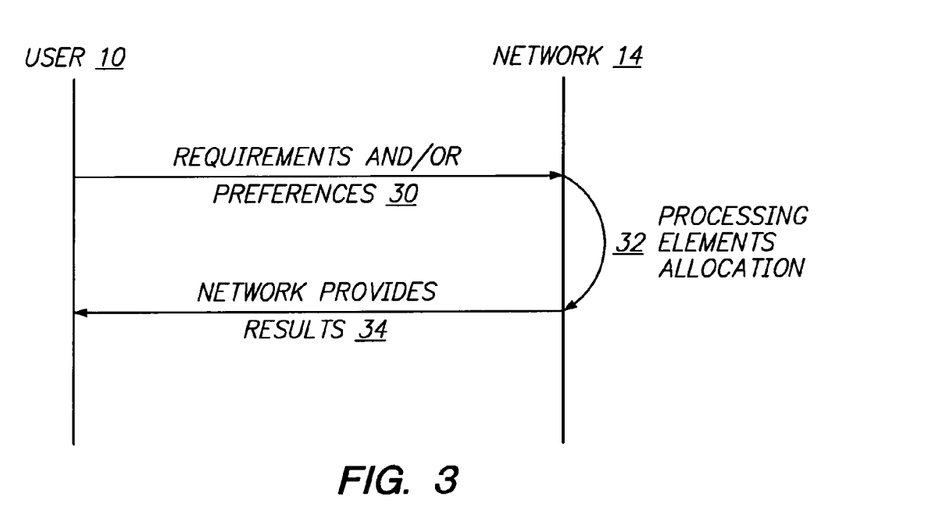
FIG. 3 is a schematic diagram illustrating signaling between a user and a network according to an exemplary embodiment.

According to an exemplary embodiment, the user specifies requirements and/or preferences as to where processing elements (with or without specified capabilities) should be allocated. Those requirements and/or preferences are sent to the network to a functionality that is configured to allocate the appropriate processing elements and make the processing elements available to the user. Thus, instead of having the user determine which processing elements to use, the user sends his/her requirements and/or preferences to the functionality and the functionality of the network determines the processing elements allocation that satisfies the requirements and/or preferences of the user. According to this exemplary embodiment which is illustrated in FIG. 3, the user sends in step 30 a request to the network. The request includes the requirements and/or preferences of the user. The amount of time invested in determining the requirements and/or preferences is less than the amount of time necessary for figuring out the processing elements allocation. The functionality noted above processes the request from the user in step 32 and determines the processing elements allocation. After the task from the user is distributed in the network and computed, the results are provided back to the user 10 by the network 14.

The functionality may also upload software components or other items, like settings on the allocated processing elements as specified by the user. More details about the functionality, how the functionality is configured and where the functionality is implemented are discussed later. However, in another embodiment, the functionality may be used to receive instructions from a user for finding an appropriate processing node in the network. Based on a result received by the user from the network, the user may log in into the found processing node using, for example, an ssh connection.

Because there are many different types of objects that may possibly be uploaded (this term is used to describe not only uploading an object but also, as discussed in the previous paragraph, determining a later remote login session) from the user to the network based on the functionality, the generic name of "droplets" is introduced for these items. Thus, a droplet my include software, settings, etc. Next, some specific examples of a network and messages exchanged between the end-user and the network are discussed with regard to FIGS. 4-8

Figure 4:
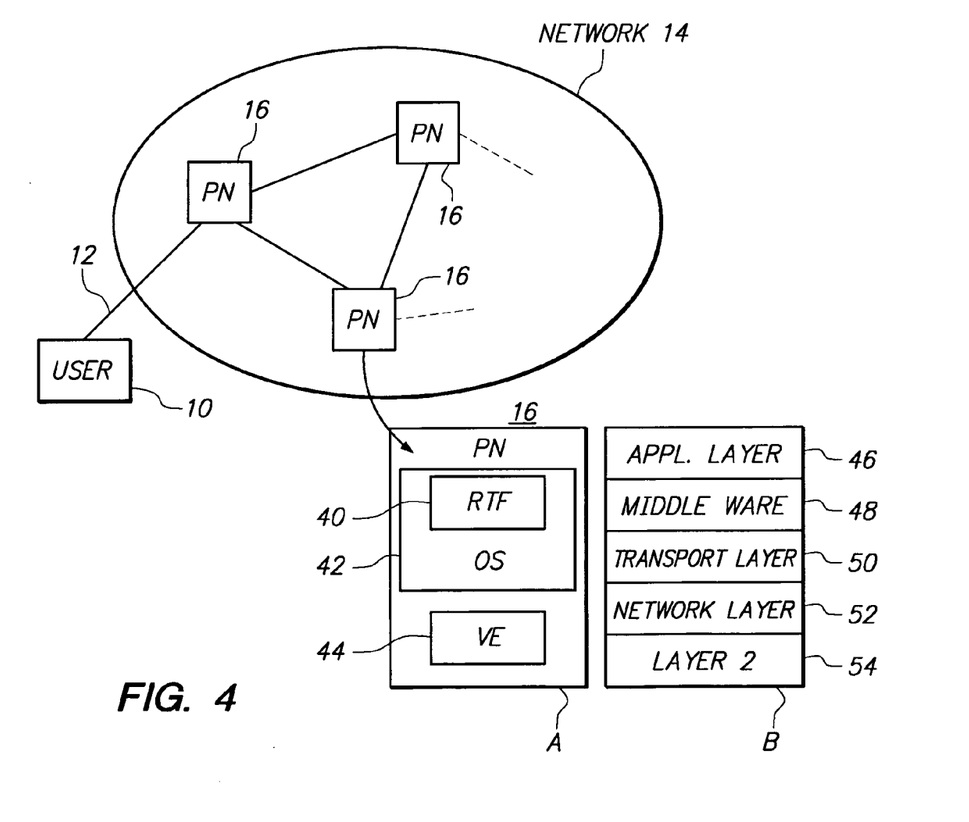
FIG. 4 is a schematic diagram of a network that includes a functionality according to an exemplary embodiment.

According to an exemplary embodiment shown in FIG. 4, the user 10 is connected, for example, via Internet 12 to a network 14. Instead of being connected via Internet 12, user 10 may be connected to the network 14 via other mechanisms, for example, ftp, telnet, ssh, virtual private network (VPN), etc. The internet connection 12 may be provided by a network provider different from network 14 or the operator of network 14. The network 14 may include one or more processing nodes PNs 16. The number of processing nodes PNs 16, which could be standalone servers, rack mounted servers, server blades attached to routers or switches, line cards with processing capabilities, base stations, etc., may be in the range of tens to thousands.

A Run-Time Fabric (RTF) 40 may run on one or more processing nodes 16. FIG. 3 illustrates one such processing node PN 16 having the run-time fabric 40 installed therein. The run-time fabric 40 may be a distributed middleware that creates a distributed execution platform of the processing nodes. In another exemplary embodiment, the run-time fabric 40 may be achieved by using a dedicated circuitry. Still in another exemplary embodiment, the run-time fabric is implemented by combining software and hardware to produce the desired functionality. The embodiment shown in FIG. 4 has the run-time fabric 40 running as software in the operation system (OS) 42. In another application, the run-time fabric 40 may interact with the OS 42 but does not have to run in the OS 42.

A processing node PN 16 may also include a virtualization engine (VE) 44 that allows the physical processing node PN 16 to be sliced into multiple virtual instances. The end-user 10, as will be discussed later, may require that an application or a component of an application may be run on a specified PN 16, a part of the PN 16, or a virtual instance that is supported by the PN 16. The high-level view of the processing node PN 16 (view A) is matched to a conceptual view of a network stack (software implementation of a computer networking protocol) from an application point of view (view B) or a virtual computer (by means of the VE 44) from the end user perspective. This conceptual view of the network stack may include an application layer 46, a middleware 48, a transport layer 50, a network layer 52, and a layer 2 54, i.e., a protocol layer which transfers data between adjacent network nodes in a network.

The functionality discussed above with regard to providing to the user the allocation of resources based on requirements and/or preferences received from the user may be implemented, in one exemplary embodiment, in the run-time fabric 40 distributed in one or more PNs 16.

For illustrating how the resource allocations is performed by the functionality run-time fabric 40, assume that user 10 (who may be, for instance, a system or software developer) has a set of droplets X, Y, and Z. A droplet has an identifier, for example, a name. A droplet may have a certain manifestation, which may be a software component (e.g., an executable program). Another manifestation may be a configuration (e.g., a description of settings). The manifestation may also be empty.

Figure 5:
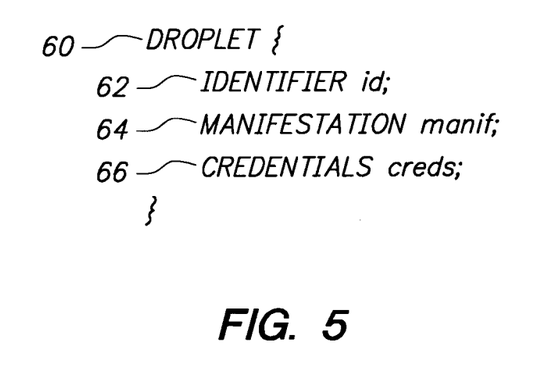
FIG. 5 is a schematic diagram of the structure of a droplet according to an exemplary embodiment.

To facilitate access to processing elements or to ensure the security of the application, a droplet can also include credentials (e.g., username and/or password, etc). If the droplet has no manifestation, the droplet may be nothing more than an identifier. In another application, if no manifestation is present, the droplet may include the identifier and the credentials. One example of a droplet is illustrated in FIG. 5, in which the droplet 60 may include the identifier 62, the manifestation 64, and the credentials 66.

Based on the structure of the droplet 60 shown in FIG. 5 and discussed above, a scenario is discussed next for exemplifying how the RTF 40 automatically handles the resource allocation in network 14 for client 10. Assume that user 10 wishes to deploy the three applications (X, Y, and Z) inside network 16. User 10 may be an Internet company that wants to run applications inside another operator's network 14. The user 10 has neither direct control over the network 14 nor knowledge of the topology of the network 14. However, the network operator has made available processing nodes PN 16 that could be rented by the user 10 to host applications of user 10.

The applications X, Y and Z of user 10 are desired to be executed on three different processing nodes. In addition, application Z should send data to application Y that in turn should send data to application X, i.e., Z→Y→X. The conditions discussed in this paragraph are the requirements of user 10. Further, user 10 may have requirements regarding the interconnecting network. For example, user 10 may need at least 50 Mbps bandwidth between applications Z and Y and at least 10 Mbps between applications Y and X. A delay along a path between applications Y and Z should be as small as possible. Furthermore, application X is CPU-intensive and application Y needs large temporary disk storage. Application Z serves users in a given geographical area so that it is desired that application Z is run on processing elements located in this given geographical area.

Figure 6:
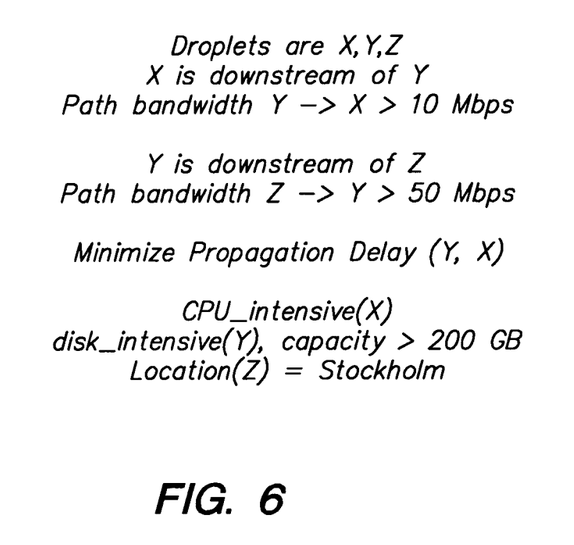
FIG. 6 is a schematic diagram of a list of requirements sent by the user to the network according to an exemplary embodiment.

Having this information that should be communicated from the user 10 to network 14 in order to generate the resource allocation, the user 10 may use a predefined language or protocol to electronically transmit the information to network 14. One possible step to be performed by the user 10 is to generate a set of mapping requirements and/or preferences for each droplet and/or the relation between droplets. An example of such mapping requirements for the present example (i.e., droplets X, Y, Z) is shown in FIG. 5. It is noted that the example shown in FIG. 6 is one of many possible languages to be used by the user when communicating information to the network. However, irrespective of language, it is noted the easiness of collecting the requirements and/or preferences at the user side. In another exemplary embodiment, the language used by a user may be different in structure from the language used by another user as long as a part of the network 14 that receives this information is able to translate these different languages to a language that is understood by the processing nodes PNs 16 of network 14.

Figure 7:
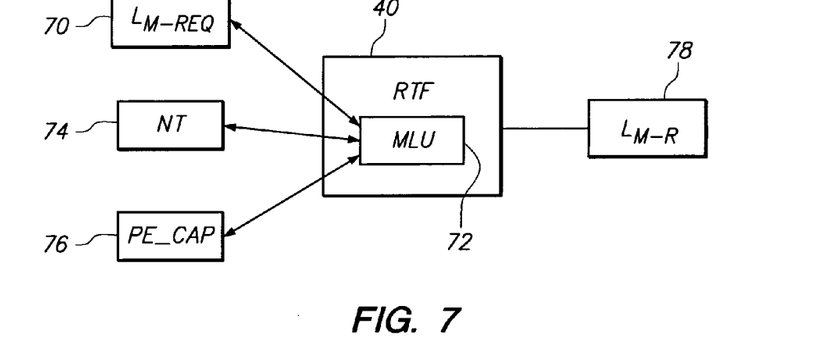
FIG. 7 is a schematic diagram of a functionality distributed at a processing node of the network according to an exemplary embodiment.

The mapping requirements and/or preferences of the user are collected in the network and assembled, for example, as text in a list $L_{mapping\_requirements}$ 70 as shown in FIG. 7. One skilled in the art would appreciate that other formats of the $L_{mapping\_requirements}$ 70 are possible. The collections and assembly may be performed by one or more processing nodes PNs 16 or other servers dedicated for this purpose. This function may be centralized or distributed.

More specifically, in one exemplary embodiment, the $L_{mapping\_requirements}$ 70 is received by a Mapping Logic Unit (MLU) 72 of the run-time fabric 40. The mapping logic unit 72 is a functionality of the run-time fabric 40 and may be implemented as software, hardware or a combination thereof. The mapping logic unit 72 is configured to interact with a network topology module (NT) 74 that is indicative of the network topology of the network 14 and a geographic location module (PE_CAP) 76 that is indicative of the geographic location of the processing elements and their availability. The PE_CAP module 76 also may have other capabilities, as for example, tracking an amount of memory, harddisk, etc. of each processing node PN 16. The topology module 74 and the geographic location module 76 are shown in FIG. 7 as being located inside network 14 but outside the run-time fabric 40. However, in one exemplary embodiment, it is possible to have one or both of the topology module 74 and the geographic location module 76 located inside the run-time fabric 40.

Figure 8:
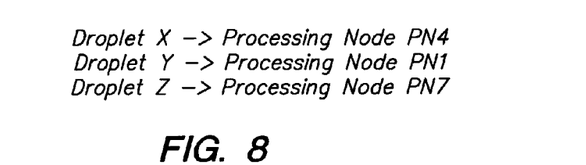
FIG. 8 is a schematic diagram of a mapping list generated by the functionality according to an exemplary embodiment.

The run-time fabric 40, based on the interaction with the topology module 74 and the geographic location module 76, uses the available information in an algorithm to determine which processing nodes should execute which droplets. This algorithm makes the computing device that runs it a specific computing device. A result of this mapping process by the run-time fabric 40 may be presented as a list $L_{mapping\_result}$ 78 as shown in FIG. 7. As an example not intended to limit the scope of the exemplary embodiments, FIG. 8 shows one possible configuration of the $L_{mapping\_result}$ 78.

The list $L_{mapping\_result}$ 78 may be sent to a Slice Manager Unit (SMU) 80 (see FIG. 9), which may be part of the run-time fabric 40. The slice manager unit 80 may be configured to create processing elements (PE) on the processing nodes PN 16 based on the instructions found in the $L_{mapping\_result}$ 78. However, if the processing element is already listed in the $L_{mapping\_requirements}$ 70, the slice manager unit 80 does not create a new processing element but uses the existing one and indicates the same in the $L_{mapping\_result}$ 78. A processing element PE may be a virtual machine, the processing node PN 16 if virtualization is not used, and/or a part of the PN 16 (e.g., one CPU core in a multi core machine, a line card if it has processing capabilities etc.). The processing element PE has a symbolic identifier that typically differs from the processing node PN identifier. The $L_{mapping\_result}$ 78 may be augmented with the processing elements identifiers, as shown for example in FIG. 10. The slice manager unit 80 may also be configured to generate/check whether any required credentials are present, when some or all of the allocated processing elements require user 10 to be authenticated.

Figure 9:
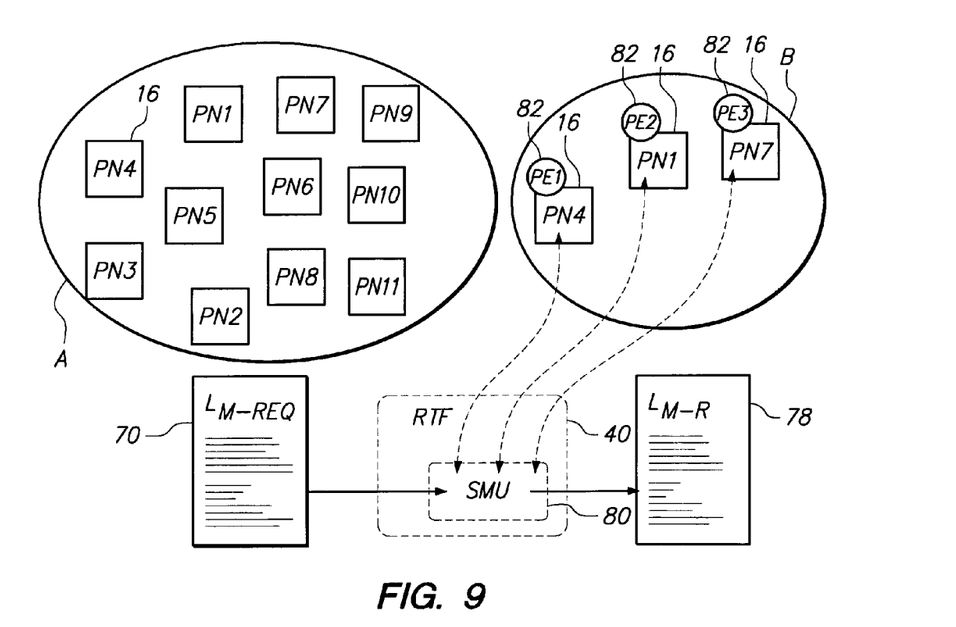
FIG. 9 is a schematic diagram of the functionality according to an exemplary embodiment.
Figure 10:
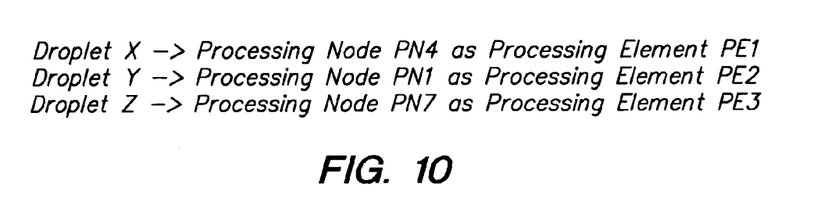
FIG. 10 is a schematic diagram of a more detailed mapping list generated by the functionality according to another exemplary embodiment.

FIG. 9 shows the slice manager unit 80 receiving the $L_{mapping\_requirements}$ 70 and contributing to the updating of the $L_{mapping\_result}$ 78 as new processing elements are created. Also, FIG. 9 shows the slice manager unit 80 creating the processing elements 82 on various processing nodes 16. In this regard, area A of FIG. 9 shows the processing nodes 16 prior to the slice manager unit 80 acting based on the $L_{mapping\_requirements}$ 70 and area B of FIG. 9 shows the created processing elements 82 as a consequence of the slice manager unit 80 actions.

Figure 11:
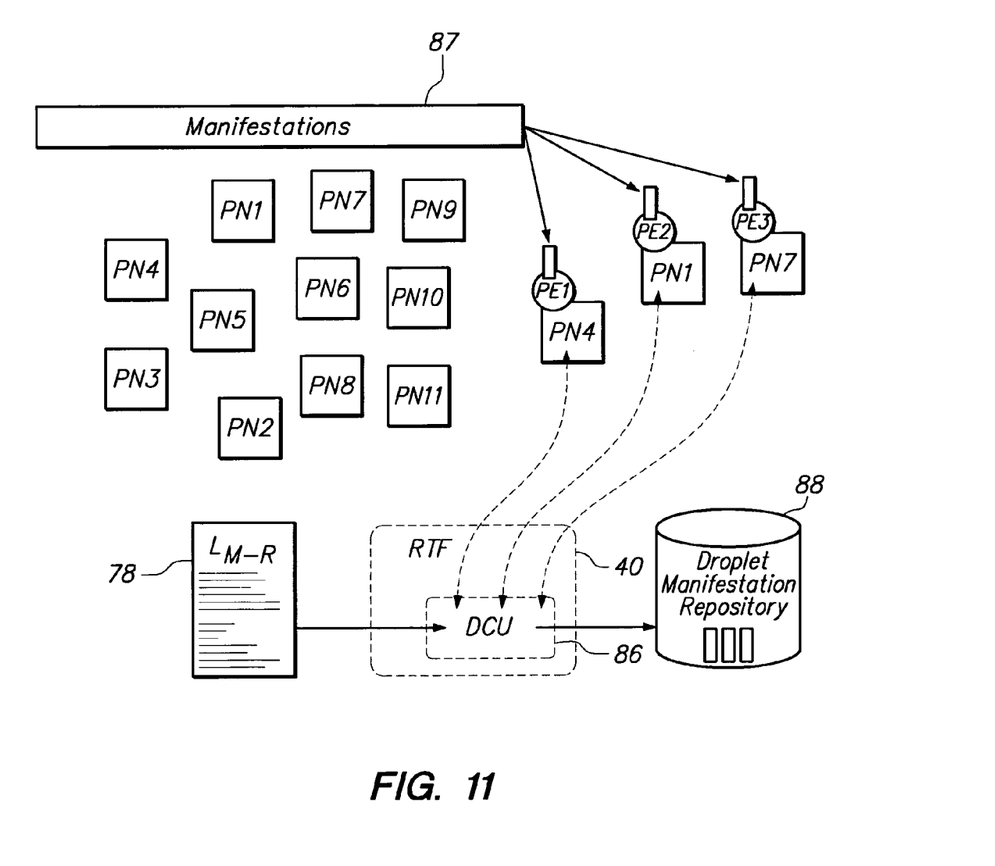
FIG. 11 is a schematic diagram of the functionality according to another exemplary embodiment.

According to an exemplary embodiment, if the droplets include manifestations, a dispatch control unit DCU 86 as shown in FIG. 11, which may be or not part of the run-time fabric 40, provides the manifestations of the droplets. The dispatch control unit 86 is implemented into software, hardware or a combination thereof and it is configured to receive the $L_{mapping\_result}$ 78. Based on this information, the dispatch control unit 86 is configured to dispatch a corresponding manifestation 87 for a droplet on an appropriate processing element 82. The dispatch control unit 86 may use data stored on a droplet manifestation repository unit 88 for determining the appropriate manifestation. The droplet manifestation repository unit 88 may be a storage unit. The user 10 may provide the droplet manifestation related information, for example, when the requirements are provided by the user 10 to the network 14. The dispatch control unit 86 may install and start execution of a software program if that is a manifestation of the droplet.

Some or all the components discussed above with reference to the run-time fabric 40 provide a functionality that helps the user 10 to minimize an interaction with the network 14, save time and achieve the desire conditions for its applications that should be run on the network. This functionality automatically determines the processing elements, their availability, their location and their characteristics based on a request generated by the user.

Figure 12:
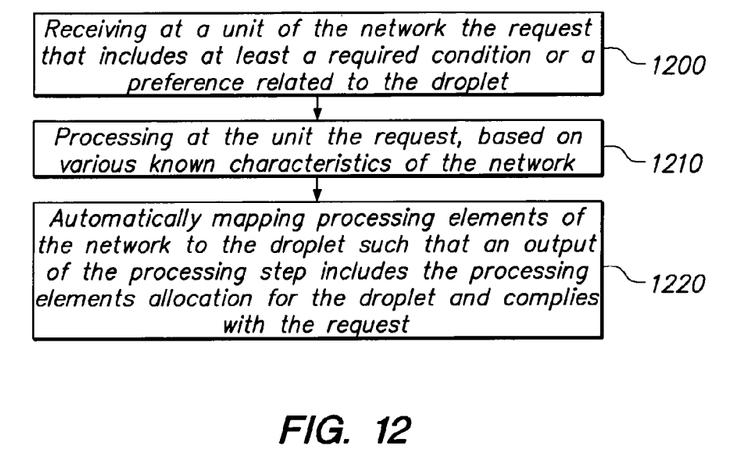
FIG. 12 is a flow chart illustrating steps of a method for generating processing elements allocation according to an exemplary embodiment.

A method for determining the processing elements allocation of the network for the needs of the user is discussed next with regard to FIG. 12. The method includes a step 1200 of receiving at a unit of the network the request that includes at least a required condition or a preference related to the droplet, a step 1210 of processing at the unit the request, based on various known characteristics of the network, and a step 1220 of automatically mapping processing elements of the network to the droplet such that an output of the processing step includes the processing elements allocation for the droplet and complies with the request.

The unit may be a processing node and a processing element may be a logical unit. The logical unit may be hosted by the processing node or another processing node. Optionally, the method may include a step of running a middleware software at the unit to implement a functionality that determines the processing elements in the network that are assigned to execute the droplet and/or determining the processing elements by taking into account at least a topology of the network, availability of the processing elements in the network, capabilities of the processing elements, or geographic location of the processing elements. In one exemplary embodiment the unit may be located closest to the user and the network includes plural of units. The request may include requirements for plural droplets and/or the request includes relationships between the droplet and the plural droplets. In another exemplary embodiment, the method may include creating the processing elements on processing nodes that exist in the network, where the processing nodes are real machines and the processing elements are at least one of the processing nodes, a part of the processing nodes, or a virtual machine running on the real machines and/or providing information about the mapped processing elements to the user. Still, the method may include receiving at the mapped processing elements the droplet from the user.

One advantage of one or more of the exemplary embodiments discussed above is the simplification noted in the processing elements allocation problem for the system developer by automating large parts of the allocation. Another advantage may be that the system developer can request processing nodes based on his location and the location of the nodes. Further, some of the exemplary embodiments have the advantage of allowing the network operator to deploy processing nodes (e.g., servers) in its network and make those nodes available to third parties without having to reveal details about how the network is designed and structured to the third parties. The users can still request servers based on location requirements without having to know all the internal details of the network.

Figure 13:
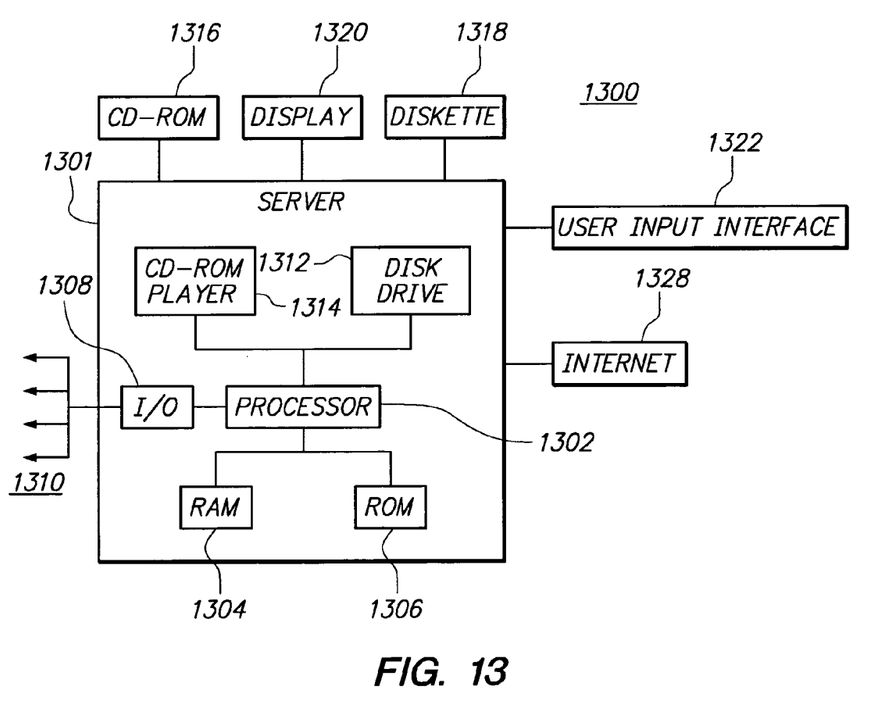
FIG. 13 is schematic diagram of a processing node for implementing the functionality.

For purposes of illustration and not of limitation, an example of a representative processing node capable of carrying out operations in accordance with the exemplary embodiments is illustrated in FIG. 13. The same structure may be used to implement unit 40. It should be recognized, however, that the principles of the present exemplary embodiments are equally applicable to other computing systems. Hardware, firmware, software or a combination thereof may be used to perform the various steps and operations described herein.

The exemplary processing node 1300 suitable for performing the activities described in the exemplary embodiments may include server 1301. Such a server 1301 may include a central processor (CPU) 1302 coupled to a random access memory (RAM) 1304 and to a read-only memory (ROM) 1306. The ROM 1306 may also be other types of storage media to store programs, such as programmable ROM (PROM), erasable PROM (EPROM), etc. The processor 1302 may communicate with other internal and external components through input/output (I/O) circuitry 1308 and bussing 1310, to provide control signals and the like. The processor 1302 carries out a variety of functions as is known in the art, as dictated by software and/or firmware instructions.

The server 1301 may also include one or more data storage devices, including hard and floppy disk drives 1312, CD-ROM drives 1314, and other hardware capable of reading and/or storing information such as DVD, etc. In one embodiment, software for carrying out the above discussed steps may be stored and distributed on a CD-ROM 1316, diskette 1318 or other form of media capable of portably storing information. These storage media may be inserted into, and read by, devices such as the CD-ROM drive 1314, the disk drive 1312, etc. The server 1301 may be coupled to a display 1320, which may be any type of known display or presentation screen, such as LCD displays, plasma display, cathode ray tubes (CRT), etc. A user input interface 1322 is provided, including one or more user interface mechanisms such as a mouse, keyboard, microphone, touch pad, touch screen, voice-recognition system, etc.

The server 1301 may be coupled to other computing devices, such as the landline and/or wireless terminals via a network. The server may be part of a larger network configuration as in a global area network (GAN) such as the Internet 1328, which allows ultimate connection to the various landline and/or mobile client devices.

The disclosed exemplary embodiments provide a unit of a processing node, a method and a computer program product for automatically determining processing elements allocation in a network. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

As also will be appreciated by one skilled in the art, the exemplary embodiments may be embodied in a wireless communication device, a telecommunication network, as a method or in a computer program product. Accordingly, the exemplary embodiments may take the form of an entirely hardware embodiment or an embodiment combining hardware and software aspects. Further, the exemplary embodiments may take the form of a computer program product stored on a computer-readable storage medium having computer-readable instructions embodied in the medium. Any suitable computer readable medium may be utilized including hard disks, CD-ROMs, digital versatile disc (DVD), optical storage devices, or magnetic storage devices such a floppy disk or magnetic tape. Other non-limiting examples of computer readable media include flash-type memories or other known memories.

Although the features and elements of the present exemplary embodiments are described in the embodiments in particular combinations, each feature or element can be used alone without the other features and elements of the embodiments or in various combinations with or without other features and elements disclosed herein. The methods or flow charts provided in the present application may be implemented in a computer program, software, or firmware tangibly embodied in a computer-readable storage medium for execution by a specifically programmed computer or processor.

What is claimed is:

1. A method for automatically providing processing elements allocation in a network that includes a plurality of processing nodes for droplets of a user based on a request of the user, the method comprising:

receiving at one of the plurality of processing nodes located in the network the request that includes the droplets, and at least one required condition related to the droplets, wherein the at least one condition includes a processing order for the droplets and a number of processing nodes to process the request;

processing at one or more of the plurality of processing nodes the request, based on various known characteristics of the network, the droplets and the at least one condition;

automatically mapping processing elements of the network to the droplets such that an output of the processing step includes the processing elements mapped for the droplets, wherein the mapping of the processing elements complies with the request, wherein the at least one required condition related to the droplets is user-specified, running a middleware software at the one or more of the plurality of processing nodes to implement a functionality that automatically determines the processing elements in the network that are mapped to execute the droplets; and creating the processing elements on a subset of the plurality of processing nodes in the network, wherein the plurality of processing nodes are real machines and the processing elements are at least one of the plurality of processing nodes, a part of the plurality of processing nodes, or a virtual machine running on the real machines.

2. The method of claim 1, further comprising:
determining the processing elements by taking into account at least a topology of the network, availability of the processing elements in the network, capabilities of the processing elements, a geographic location of the processing elements and/or a geographic location of the user.

3. The method of claim 1, wherein the processing node is located closest to the user and the network includes plural processing nodes.

4. The method of claim 1, wherein the droplets include an identifier a manifestation and credentials, wherein the manifestation is an executable program and the credentials include a password.

5. The method of claim 1, wherein the at least one condition includes memory requirements, path bandwidth information, and a geographic location request for at least one of the processing nodes which is to process one of the droplets.

6. The method of claim 1, further comprising:
providing information about the mapped processing elements to the user; and receiving at the mapped processing elements the droplets from the user.

7. The method of claim 1, wherein the step of receiving comprises:
receiving only one request from the user.

8. A processing node in a network that includes a plurality of processing nodes for automatically providing processing elements allocation in the network for droplets of a user based on a request of the user, the processing node comprising:
a processor,
a memory storing instructions for causing the processor to execute to:
receive the request that includes the droplets and at least one required condition or preference related to the droplets, wherein the at least one required condition or preference includes a processing order for the droplets and a number of processor nodes to process the request,
process the request, based on various known characteristics of the network, the droplets and the at least one condition, and
automatically map processing elements of the network to the droplets such that an output of the processing step includes the processing elements mapped for the droplets;
wherein the mapping of the processing elements complies with the request,
wherein the at least one required condition or preference related to the droplets is user-specified, and
running a middleware software at the one or more of the plurality of processing nodes to implement a functionality that automatically determines the processing elements in the network that are mapped to execute the droplets; and
wherein the processor is further configured to create the processing elements on a subset of the plurality of processing nodes that exist in the network, wherein the plurality of processing nodes are real machines and the processing elements are at least one of the plurality of processing nodes, a part of the plurality of processing nodes, or a virtual machine running on the real machines.

9. The processing node of claim 8, wherein the processor is further configured to determine the processing elements by taking into account at least a topology of the network, availability of the processing elements in the network, capabilities of the processing elements, a geographic location of the processing elements, and/or a geographic location of the user.

10. The processing node of claim 8, wherein the processor is further configured to provide information about the mapped processing elements to the user.

11. The processing node of claim 10, wherein the processor is further configured to receive the droplets from the user and to distribute the droplets to the mapped processing elements.

12. A non-transitory computer readable medium including computer executable instructions, wherein the instructions, when executed, implement a method for automatically providing processing elements allocation in a network that includes a plurality of processing nodes for droplets of a user based on a request of the user, the method comprising:
providing a system comprising distinct software modules, wherein the distinct software modules comprise a run-time fabric module and a mapping logic unit module;
receiving at the run-time fabric module the request that includes droplets and at least one required condition or preference related to the droplets wherein the at least one condition or preference includes a processing order for the droplets and a number of processing nodes to process the request;
processing at the mapping logic unit module the request, based on various known characteristics of the network the droplets and the at least one condition; and
automatically mapping processing elements of the network to the droplets such that an output of the processing step includes the processing elements mapped for the droplets,
wherein the mapping of the processing elements complies with the request,
wherein the at least one required condition related to the droplets is user-specified,
running a middleware software at the one or more of the plurality of processing nodes to implements a functionality that automatically determines the processing elements in the network that are mapped to execute the droplets; and
creating the processing elements on a subset of the plurality of processing nodes in the network, wherein the plurality of processing nodes are real machines and the processing elements are at least one of the plurality of processing nodes, a part of the plurality of processing nodes, or a virtual machine running on the real machines.

* * * * *